United States Patent
Marpu et al.

(10) Patent No.: US 11,824,178 B2
(45) Date of Patent: Nov. 21, 2023

(54) THERMAL INTERFACE MATERIAL POSITIONING WITHIN A TRACTION BATTERY PACK

(71) Applicant: Ford Global Technologies, LLC, Dearborn, MI (US)

(72) Inventors: Amar Marpu, Canton, MI (US); George Albert Garfinkel, Westland, MI (US); Jason Luke Sielaff, Brighton, MI (US); Eric Yoo, Ellicott City, MD (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 17/337,581

(22) Filed: Jun. 3, 2021

(65) Prior Publication Data

US 2022/0393268 A1 Dec. 8, 2022

(51) Int. Cl.
*H01M 10/6554* (2014.01)
*H01M 10/613* (2014.01)
*H01M 10/6568* (2014.01)
*H01M 10/653* (2014.01)
*H01M 10/6556* (2014.01)
*H01M 10/6557* (2014.01)
*H01M 10/6567* (2014.01)
*H01M 50/204* (2021.01)
*H01M 50/258* (2021.01)
*H01M 10/6551* (2014.01)
*H05K 7/20* (2006.01)
(Continued)

(52) U.S. Cl.
CPC ......... *H01M 10/6554* (2015.04); *B60L 50/64* (2019.02); *H01M 10/613* (2015.04); *H01M 10/625* (2015.04); *H01M 10/6568* (2015.04); *B60K 2001/0438* (2013.01); *B60L 2240/545* (2013.01); *H01M 2220/20* (2013.01)

(58) Field of Classification Search
CPC .......... H01M 10/6551; H01M 10/653; H01M 10/6552; H01M 10/6556; H01L 23/3737; H01L 23/42; H01L 23/473; H01L 24/32; H01L 24/82; H01L 24/2929; H01L 24/29
See application file for complete search history.

(56) References Cited

U.S. PATENT DOCUMENTS 8,481,103 B1 * 7/2013 Davidson ................ H01L 24/29
427/369
9,265,178 B2 2/2016 Arvelo et al.
(Continued)

FOREIGN PATENT DOCUMENTS

WO WO-2022236425 A1 * 11/2022

OTHER PUBLICATIONS

Thermal Interface Material Dispensing Guide, Parker Chomerics, p. 1-20, retrieved from https://www.parker.com.

*Primary Examiner* — Pamela H Weiss
*Assistant Examiner* — Amanda Rosenbaum
(74) *Attorney, Agent, or Firm* — David B. Kelley; Carlson, Gaskey & Olds, P.C.

(57) ABSTRACT

A traction battery assembly according to an exemplary aspect of the present disclosure includes, among other things, a thermal exchange plate having a plurality of coolant channels distributed within the thermal exchange plate according to a first pattern, and a thermal interface material disposed on a surface of the thermal exchange plate according to a second pattern. The first pattern mimics the second pattern.

20 Claims, 4 Drawing Sheets

(51) Int. Cl.
    *H01M 10/625*      (2014.01)
    *B60L 50/64*      (2019.01)
    *B60K 1/04*      (2019.01)

(56) References Cited

U.S. PATENT DOCUMENTS

| | | | |
|---|---|---|---|
| 2006/0286712 A1* | 12/2006 | Brunschwiler | H01L 24/83 438/106 |
| 2008/0073028 A1* | 3/2008 | Yu | H01L 24/83 156/289 |
| 2017/0028869 A1 | 2/2017 | Boddakayala et al. | |
| 2019/0288353 A1* | 9/2019 | Harris | F28F 1/022 |
| 2019/0348726 A1 | 11/2019 | Marpu et al. | |
| 2020/0227794 A1* | 7/2020 | Mazza | H01M 10/6567 |
| 2022/0271366 A1* | 8/2022 | Cate | H01M 10/613 |

\* cited by examiner

THERMAL INTERFACE MATERIAL POSITIONING WITHIN A TRACTION BATTERY PACK

TECHNICAL FIELD

This disclosure relates generally to a traction battery pack and, more particularly, to how thermal interface material (TIM) is positioned within the traction battery pack.

BACKGROUND

Electrified vehicles differ from conventional motor vehicles because electrified vehicles can be selectively driven by one or more electric machines that are powered by a traction battery pack. The electric machines can propel the electrified vehicles instead of, or in combination with, an internal combustion engine.

The traction battery pack includes battery cells that store energy for powering electrical loads. The battery cells can generate thermal energy during charging and discharging operations. Thermal exchange plates, often referred to as "cold plates," can be used for dissipating thermal energy. A thermal interface material (TIM) may also be used to increase the thermal conductivity between the battery cells and the thermal exchange plate.

SUMMARY

A traction battery assembly according to an exemplary aspect of the present disclosure includes, among other things, a thermal exchange plate having a plurality of coolant channels distributed within the thermal exchange plate according to a first pattern, and a thermal interface material disposed on a surface of the thermal exchange plate according to a second pattern. The first pattern mimics the second pattern.

Another example of the foregoing assembly includes at least one battery array disposed on the surface.

In another example of any of the foregoing assemblies, the thermal interface material is sandwiched between the at least one battery array and the surface.

Another example of any of the foregoing assemblies includes open areas between one of the battery arrays and the surface. The open areas lack thermal interface material.

In another example of any of the foregoing assemblies, the open areas are circumferentially surrounded by the thermal interface material disposed on the surface.

In another example of any of the foregoing assemblies, the coolant channels are configured to communicate a liquid coolant through the thermal exchange plate.

In another example of any of the foregoing assemblies, the thermal interface material is silicone-based.

In another example of any of the foregoing assemblies, the thermal interface material is urethane-based.

In another example of any of the foregoing assemblies, the thermal interface material is acrylic-based.

In another example of any of the foregoing assemblies, the thermal exchange plate is integrated into a tray of a traction battery pack.

A method of traction battery assembly according to yet another exemplary aspect of the present disclosure includes dispensing a thermal interface material onto a surface of a thermal exchange plate. The thermal exchange plate has coolant channels distributed within the thermal exchange plate according to a first pattern. The thermal interface material is dispensed on the surface according to a second pattern that mimics the first pattern.

Another example of the foregoing method includes, after the dispensing, compressing the thermal interface material with at least one battery array of a traction battery pack.

Another example of any of the foregoing methods includes dispensing the thermal interface material as a bead.

Another example of any of the foregoing methods includes, after the compressing, open areas between one of the battery arrays and the surface lack thermal interface material.

In another example of any of the foregoing methods the open areas are circumferentially surrounded by the thermal interface material disposed on the surface.

Another example of any of the foregoing methods includes supporting at least one traction battery array on the surface.

Another example of any of the foregoing methods includes communicating a liquid coolant through the coolant channels of the thermal exchange plate.

In another example of any of the foregoing methods, the thermal interface material is silicone-based.

Another example of any of the foregoing methods includes dispensing the thermal interface material from a dispensing assembly, moving the dispensing assembly relative to the surface during the dispensing, and varying a velocity of the moving based on a size of the plurality of coolant channels.

In another example of any of the foregoing methods, the velocity is decreased where the plurality of coolant channels are wider, and the velocity is increased where the plurality of coolant channels are narrower.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A traction battery pack has a thermal interface material (TIM) on surface of a thermal exchange plate. TIM that is deposited on the surface according to how coolant channels within the thermal exchange plate are arranged. The TIM can be a liquid TIM, which is dispensed onto the thermal exchange plate as a liquid/paste and then compressed when a battery array is decked in place.

Figure 1:
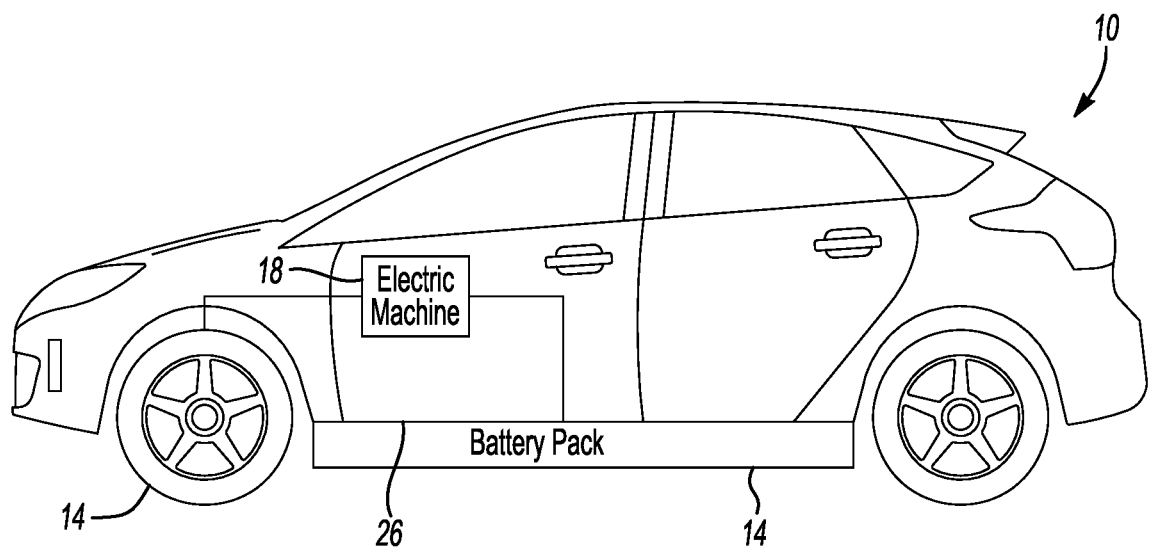
FIG. 1 shows a side view of an electrified vehicle according to an exemplary aspect of the present disclosure.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which can selectively drive wheels using torque provided by an internal combustion engine instead, or in addition to, an electric machine. Generally, the electrified vehicle 10 could be any type of vehicle having a traction battery pack.

Figure 2:
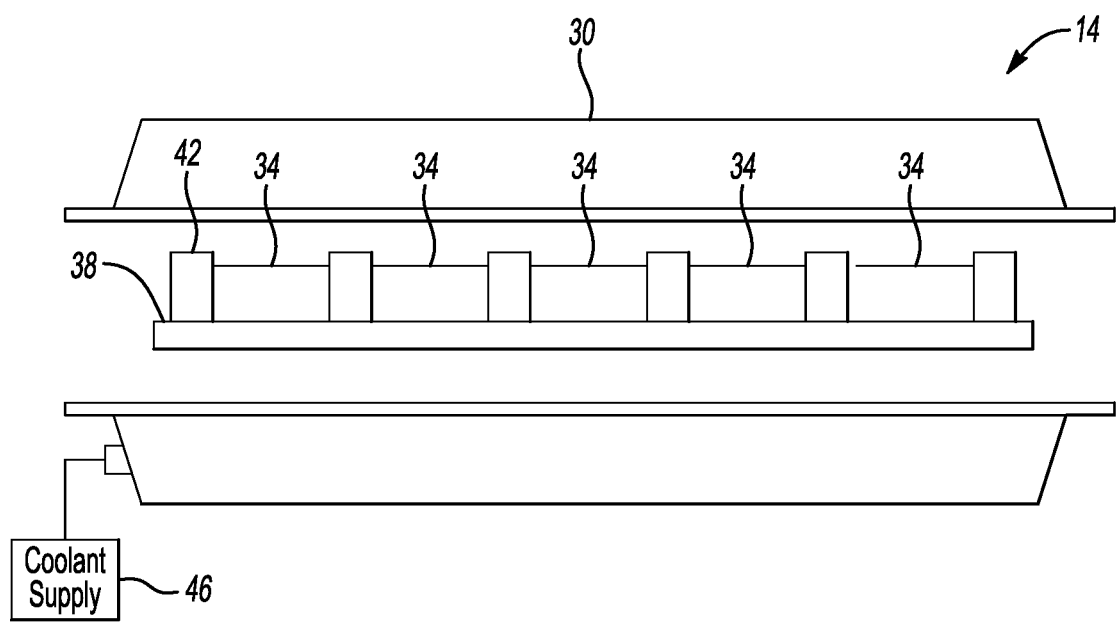
FIG. 2 illustrates an expanded view of a battery pack from the electrified vehicle of FIG. 1.

Referring now to FIG. 2, the battery pack 14 includes an enclosure 30 that encloses a plurality of battery arrays and a thermal exchange plate 38. Support beams 42 can extend between rows of the battery arrays in a cross-vehicle direction.

To manage thermal energy levels within the battery arrays 34 and other areas of the traction battery pack 14, coolant can be circulated between the coolant supply and the coolant channels within the thermal exchange plate 38. The coolant can be a liquid coolant.

Figure 3:
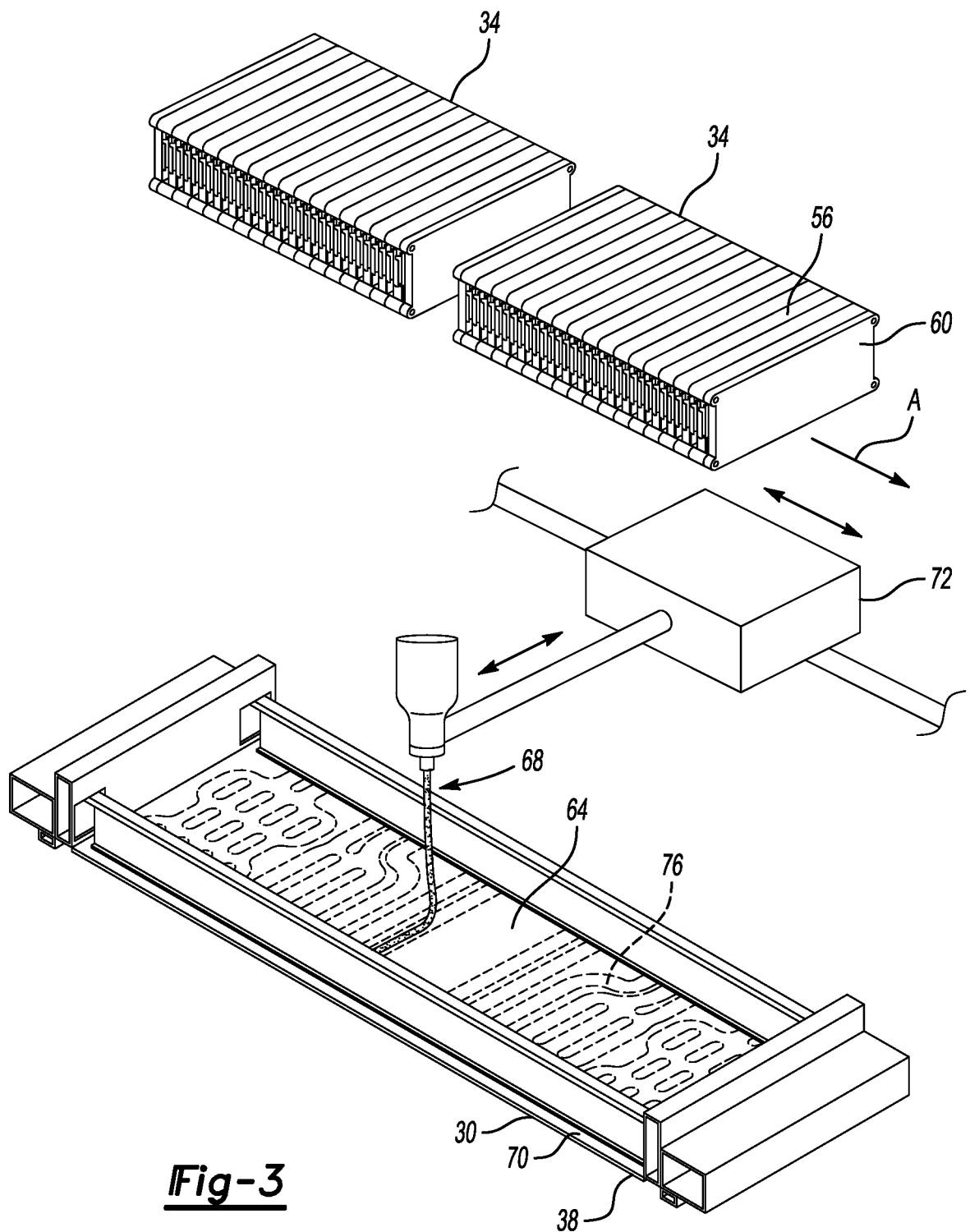
FIG. 3 illustrates a perspective view of a portion of the battery pack from FIG. 2.

Referring now to FIG. 3, the arrays 34 each include a plurality of individual battery cells held within frames 56 and disposed along an axis A between opposing end plates 60. Bottoms of the battery cells face with a surface 64 of the thermal exchange plate 38.

The thermal exchange plate 38 can be a metal or metal alloy material. To facilitate transfer of thermal energy between the arrays 34 and the thermal exchange plate 38, a thermal interface material (TIM) 68 is placed on the surface 64. When the battery pack 14 is assembled, the TIM 68 is sandwiched between the battery cells and the surface 64. The TIM 68 can be a liquid thermal interface material that cures and hardens after a certain time interval, say two hours.

In FIG. 3, the thermal exchange plate 38 is integrated into a tray 70 of the enclosure 30. That is, the same structure that provides the thermal exchange plate 38 also provides the tray 70 of the enclosure 30. In other examples, such as the variation shown in FIG. 2, the thermal exchange plate 38 is separate from a tray of the enclosure 30.

In this example, a TIM dispensing assembly 72 is used to apply the TIM 68 to the surface 64. The TIM dispensing assembly 72 is a robotic applicator assembly that can deposit TIM 68 on the surface 64 in a desired pattern.

In the past, TIM has been used between battery cells and thermal exchange plates. The TIM was distributed over a thermal exchange plate in a series of rows without regard to the positioning of coolant channels. In the past, the rows of TIM may have had a pattern of straight beads where the beads followed the pattern of the battery cells, not the coolant channels within the thermal exchange plate.

In the exemplary embodiment, the TIM dispensing assembly 72 does not dispense the TIM 68 in a way that would cause TIM 68 to cover the entire surface 64. Instead, the TIM dispensing assembly 72 dispenses TIM 68 on the surface 64 in a pattern that mimics a pattern of coolant channels 76 within the thermal exchange plate 38. That is, the TIM 68 is dispensed on the surface 64 in the same pattern as the coolant channels 76.

In an example, the TIM 68 is dispensed from the TIM dispensing assembly 72 at a consistent rate. In areas when the coolant channels 76 are wider, the velocity of the TIM dispensing assembly 72 may be slowed so that more TIM 68 is deposited in these areas. Where the coolant channels 76 are narrower, the velocity of the TIM dispensing assembly 72 can be increased. The TIM dispensing assembly 72 is shown as moving during the dispensing. In another example, the surface 64 could be moved rather than the TIM dispensing assembly 72.

The coolant channels 76 are used to communicate coolant through the thermal exchange plate 38. Thermal energy is primarily transferred through areas of the thermal exchange plate 38 that are between the channels and the surface 64.

Applying TIM 68 in a pattern that mimics the pattern of the coolant channels ensures that the TIM 68 is in areas most appropriate for transfer of thermal energy between the battery arrays 34 and coolant within the coolant channels 76. TIM 68 can be omitted from other areas of the surface 64 that are responsible for relatively little thermal energy transfer. This can reduce an overall amount of TIM 68 required within the battery pack 14.

The TIM 68, in this example, is a liquid TIM that is silicone-based. In other examples, the TIM is acrylic-based or urethane-based.

The TIM 68 can be a single-component (1K) material, and the mechanism of cure for the TIM 68 can be aerobic, anaerobic, heat-based, light-based, or some other mechanism.

The thermal interface material could instead be a two-component (2K) material, the two parts (resin and hardener) can be joined at some specified ratio in order to realize a cure, and the mechanism of cure can be aerobic, anaerobic, heat-based, light-based, or some other mechanism.

Figure 4:
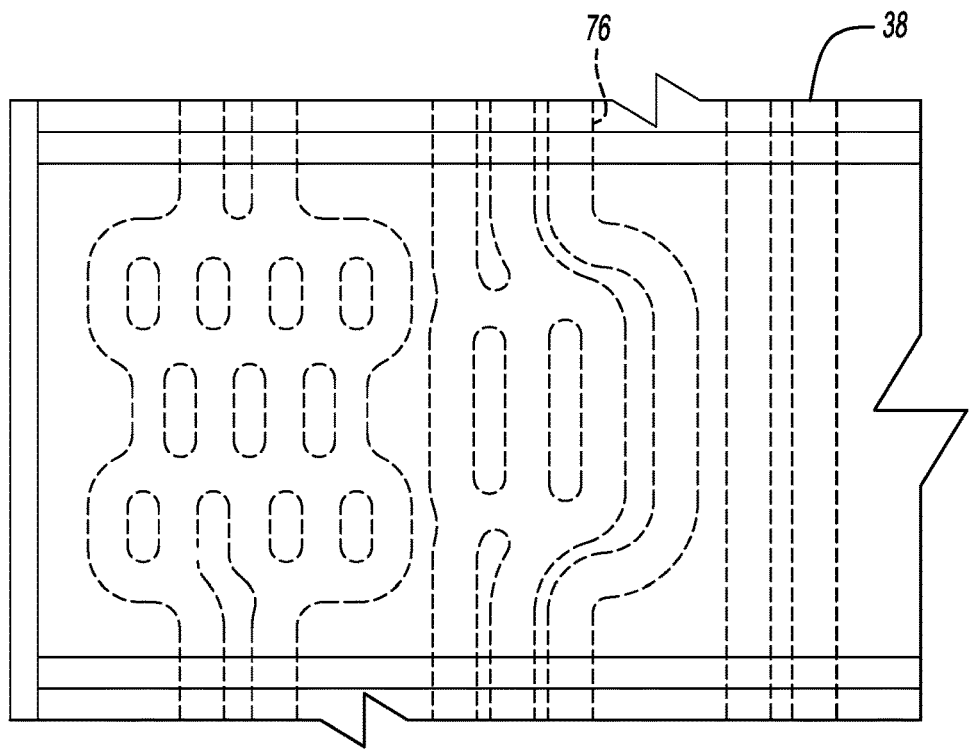
FIG. 4 illustrates a close-up view of a portion of a thermal exchange plate from the battery pack of FIG. 2 with coolant channels shown in broken lines.

FIG. 4 shows a portion of the thermal exchange plate 38 having coolant channels 76 in a particular pattern. A designer could route the coolant channels 76 in a desired way to facilitate thermal energy transfer.

Figure 5:
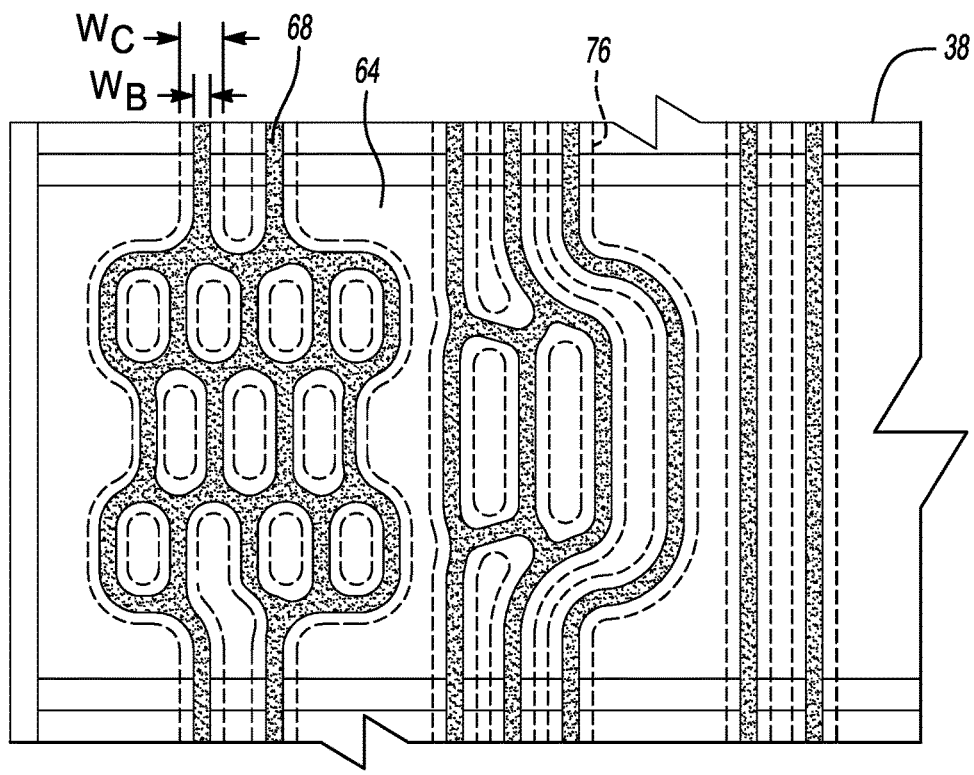
FIG. 5 illustrates the portion of FIG. 4 after thermal interface material has been applied to a surface of the thermal exchange plate.

FIG. 5 shows the section of FIG. 4 after the TIM 68 is applied to the surface 64. As can be appreciated, the pattern of the TIM 68 after being distributed on the surface 64 mimics the pattern of the coolant channels 76 within the thermal exchange plate 38. The TIM 68 is positioned within the battery pack 14 to align with the coolant channels 76.

The TIM 68, in this example, is applied as a bead. A width WB of the bead can be slightly smaller than a width Wc of the coolant channels 76.

Placing the arrays 34 on the thermal exchange plate 38 sandwiches the bead of TIM 68 between the battery arrays 34 and the surface 64. The arrays 34 squeeze the bead of (liquid) TIM 68 causing the TIM 68 to spread out to the position of FIG. 6. The TIM 68 spreads out, in this example, just past the coolant channels 76. The TIM 68 then cures.

Figure 6:
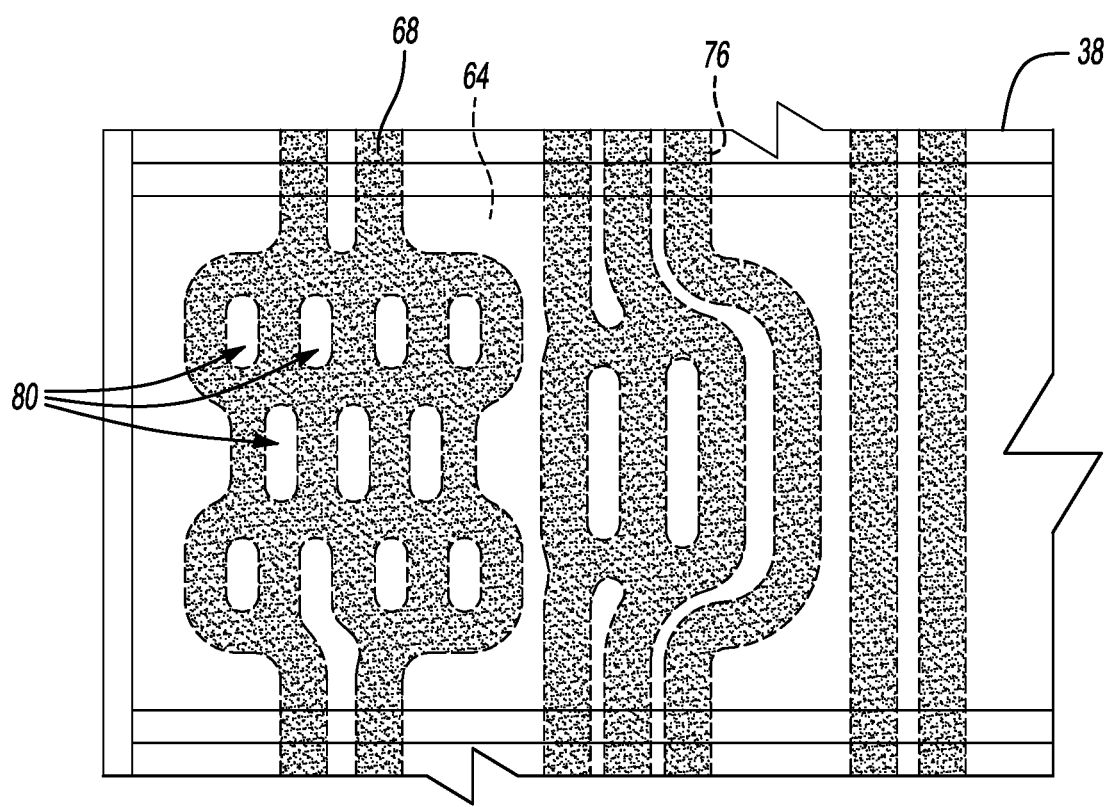
FIG. 6 illustrates the portion of FIG. 5 after battery cells positioned on the thermal exchange plate have spread out the thermal interface material. For drawing clarity, the battery cells are not shown.

In FIG. 6, areas of the surface 64 that are between the arrays 34 and a coolant channel 76 are covered by TIM 68. The TIM 68 does not extend substantially into other areas of the surface 64. This approach utilizes less TIM 68 than if the entire surface 64 were covered by TIM 68. This can reduce an amount of TIM 68 which can save cost and weight.

The TIM 68 is distributed, in the exemplary embodiment, such that there are a plurality of open areas 80 lacking TIM 68. The open areas 80 are circumferentially surrounded by the TIM 68 after the TIM 68 is sandwiched between the thermal exchange plate 38 and the battery arrays 34 disposed on the surface 64.

Features of the disclosed examples include positioning the TIM in areas where the TIM is most beneficial to thermal energy transfer while omitting the TIM from other areas. This can reduce a total volume of TIM required when compared to a traditional straight-bead pattern, thus reducing cost and weight.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
    a thermal exchange plate having a plurality of coolant channels distributed within the thermal exchange plate according to a first pattern; and
    a thermal interface material that is external to the thermal exchange plate and is disposed on a surface of the thermal exchange plate according to a second pattern, wherein the first pattern mimics the second pattern.

2. The traction battery assembly of claim 1, further comprising at least one battery array disposed on the surface, the thermal interface material disposed between the plurality of coolant channels and the at least one battery array.

3. The traction battery assembly of claim 2, wherein the thermal interface material directly contacts the at least one battery array and is sandwiched between the at least one battery array and the surface.

4. The traction battery assembly of claim 2, wherein a plurality of open areas between the at least one battery array and the surface lack thermal interface material.

5. The traction battery assembly of claim 4, wherein the plurality of open areas are circumferentially surrounded by the thermal interface material disposed on the surface.

6. The traction battery assembly of claim 1, wherein the plurality of coolant channels are configured to communicate a liquid coolant through the thermal exchange plate.

7. The traction battery assembly of claim 1, wherein the thermal interface material is silicone-based.

8. The traction battery assembly of claim 1, wherein the thermal interface material urethane-based.

9. The traction battery assembly of claim 1, wherein the thermal interface material is acrylic-based.

10. The traction battery assembly of claim 1, wherein the thermal exchange plate is integrated into a tray of a traction battery pack.

11. A method of traction battery assembly, comprising:
    dispensing a thermal interface material onto an outer surface of a thermal exchange plate,
        the thermal exchange plate having a plurality of coolant channels distributed within the thermal exchange plate according to a first pattern,
        the thermal interface material dispensed on the outer surface according to a second pattern that mimics the first pattern.

12. The method of claim 11, further comprising, after the dispensing, directly contacting the thermal interface material with at least one battery array of a traction battery pack, and compressing the thermal interface material with the at least one battery array of the traction battery pack.

13. The method of claim 12, further comprising dispensing the thermal interface material as a bead.

14. The method of claim 12, wherein, after the compressing, a plurality of open areas between the at least one battery array and the surface lack thermal interface material.

15. The method of claim 14, wherein the plurality of open areas are circumferentially surrounded by the thermal interface material disposed on the outer surface.

16. The method of claim 11, further comprising supporting at least one traction battery array on the outer surface.

17. The method of claim 11, further comprising communicating a liquid coolant through the coolant channels of the thermal exchange plate.

18. The method of claim 11, wherein the thermal interface material is silicone-based.

19. A method of traction battery assembly, comprising:
    dispensing a thermal interface material onto a surface of a thermal exchange plate,
        the thermal exchange plate having a plurality of coolant channels distributed within the thermal exchange plate according to a first pattern,
        the thermal interface material dispensed on the surface according to a second pattern that mimics the first pattern;
    dispensing the thermal interface material from a dispensing assembly;
    moving the dispensing assembly relative to the surface during the dispensing; and
    varying a velocity of the moving based on a size of the plurality of coolant channels.

20. The method of claim 19, wherein the velocity is decreased where the plurality of coolant channels are wider, and the velocity is increased where the plurality of coolant channels are narrower.

* * * * *